(12) United States Patent
Morita et al.

(10) Patent No.: US 10,937,588 B2
(45) Date of Patent: Mar. 2, 2021

(54) COIL

(71) Applicant: IBIDEN CO., LTD., Ogaki (JP)

(72) Inventors: Haruhiko Morita, Ogaki (JP); Shinobu Kato, Ogaki (JP); Hitoshi Miwa, Ogaki (JP); Hisashi Kato, Ogaki (JP); Toshihiko Yokomaku, Ibi-gun (JP)

(73) Assignee: IBIDEN CO., LTD., Ogaki (JP)

( * ) Notice: Subject to any disclaimer, the term of this patent is extended or adjusted under 35 U.S.C. 154(b) by 156 days.

(21) Appl. No.: 16/019,591

(22) Filed: Jun. 27, 2018

(65) Prior Publication Data

US 2018/0374630 A1 Dec. 27, 2018

(30) Foreign Application Priority Data

Jun. 27, 2017 (JP) ................. 2017-124866

(51) Int. Cl.
| | | |
|---|---|---|
| H01F 27/28 | (2006.01) | |
| H01F 5/00 | (2006.01) | |
| H01F 17/00 | (2006.01) | |
| H02K 3/00 | (2006.01) | |
| H02K 41/03 | (2006.01) | |

(52) U.S. Cl.
CPC .......... *H01F 27/2847* (2013.01); *H01F 5/00* (2013.01); *H01F 5/003* (2013.01); *H01F 17/0013* (2013.01); *H01F 27/2804* (2013.01); *H02K 3/00* (2013.01); *H01F 2017/002* (2013.01); *H01F 2017/006* (2013.01); *H01F 2017/0066* (2013.01); *H01F 2017/0073* (2013.01); *H01F 2027/2861* (2013.01); *H02K 41/03* (2013.01)

(58) Field of Classification Search
CPC ........ H01F 5/00; H01F 5/003; H01F 17/0013; H01F 27/2847; H01F 27/2804; H01F 2017/006; H01F 2017/0073; H01F 2017/002; H01F 2027/2861; H02K 3/00; H02K 41/03
USPC .............. 336/200, 170, 223, 147, 233, 232; 310/208, 268, 71
See application file for complete search history.

(56) References Cited

U.S. PATENT DOCUMENTS

| | | | | |
|---|---|---|---|---|
| 3,484,731 A | * | 12/1969 | Rich | ................... H01F 17/0006 336/200 |
| 4,658,162 A | * | 4/1987 | Koyama | ................. H01F 5/003 310/184 |
| 5,276,421 A | * | 1/1994 | Boitard | ............... H01F 27/2804 336/180 |

(Continued)

FOREIGN PATENT DOCUMENTS

JP 2001-135548 A 5/2001

*Primary Examiner* — Mang Tin Bik Lian
(74) *Attorney, Agent, or Firm* — Oblon, McClelland, Maier & Neustadt, L.L.P.

(57) ABSTRACT

A coil includes a resin substrate, a first coil structure formed on a first surface of the resin substrate, a second coil structure formed on a second surface of the resin substrate on the opposite side with respect to the first surface such that the second coil structure is formed at a position corresponding to the first coil structure, a third coil structure formed on the second surface such that the third coil structure is positioned adjacent to the second coil structure, and a fourth coil structure formed on the first surface such that the fourth coil structure is formed at a position corresponding to the third coil structure. The resin substrate is folded such that the second coil structure and the third coil structure oppose each other.

20 Claims, 6 Drawing Sheets

(56) References Cited

U.S. PATENT DOCUMENTS

| | | | | |
|---|---|---|---|---|
| 5,644,183 | A * | 7/1997 | Van Loenen | H02K 21/24 |
| | | | | 310/268 |
| 2005/0285470 | A1* | 12/2005 | Itoh | H02K 3/26 |
| | | | | 310/208 |
| 2007/0296369 | A1* | 12/2007 | Yeh | H02K 41/0356 |
| | | | | 318/696 |
| 2009/0121955 | A1* | 5/2009 | Kubo | H01Q 1/38 |
| | | | | 343/788 |
| 2010/0079232 | A1* | 4/2010 | Okawa | H01F 17/0006 |
| | | | | 336/200 |
| 2011/0140564 | A1* | 6/2011 | Nomura | H02K 3/26 |
| | | | | 310/208 |

\* cited by examiner

US 10,937,588 B2

COIL

CROSS-REFERENCE TO RELATED APPLICATIONS

The present application is based upon and claims the benefit of priority to Japanese Patent Application No. 2017-124866, filed Jun. 27, 2017, the entire contents of which are incorporated herein by reference.

BACKGROUND OF THE INVENTION

Field of the Invention

The present invention relates to a coil formed by folding a resin substrate having multiple coil patterns formed on both sides thereof.

Description of Background Art

Japanese Patent Laid-Open Publication No. 2001-135548 describes an electronic component in which a coil as an inductance is formed by laminating multiple insulating layers in which conductor patterns are formed. The entire contents of this publication are incorporated herein by reference.

SUMMARY OF THE INVENTION

According to one aspect of the present invention, a coil includes a resin substrate, a first coil structure formed on a first surface of the resin substrate, a second coil structure formed on a second surface of the resin substrate on the opposite side with respect to the first surface such that the second coil structure is formed at a position corresponding to the first coil structure, a third coil structure formed on the second surface such that the third coil structure is positioned adjacent to the second coil structure, and a fourth coil structure formed on the first surface such that the fourth coil structure is formed at a position corresponding to the third coil structure. The resin substrate is folded such that the second coil structure and the third coil structure oppose each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
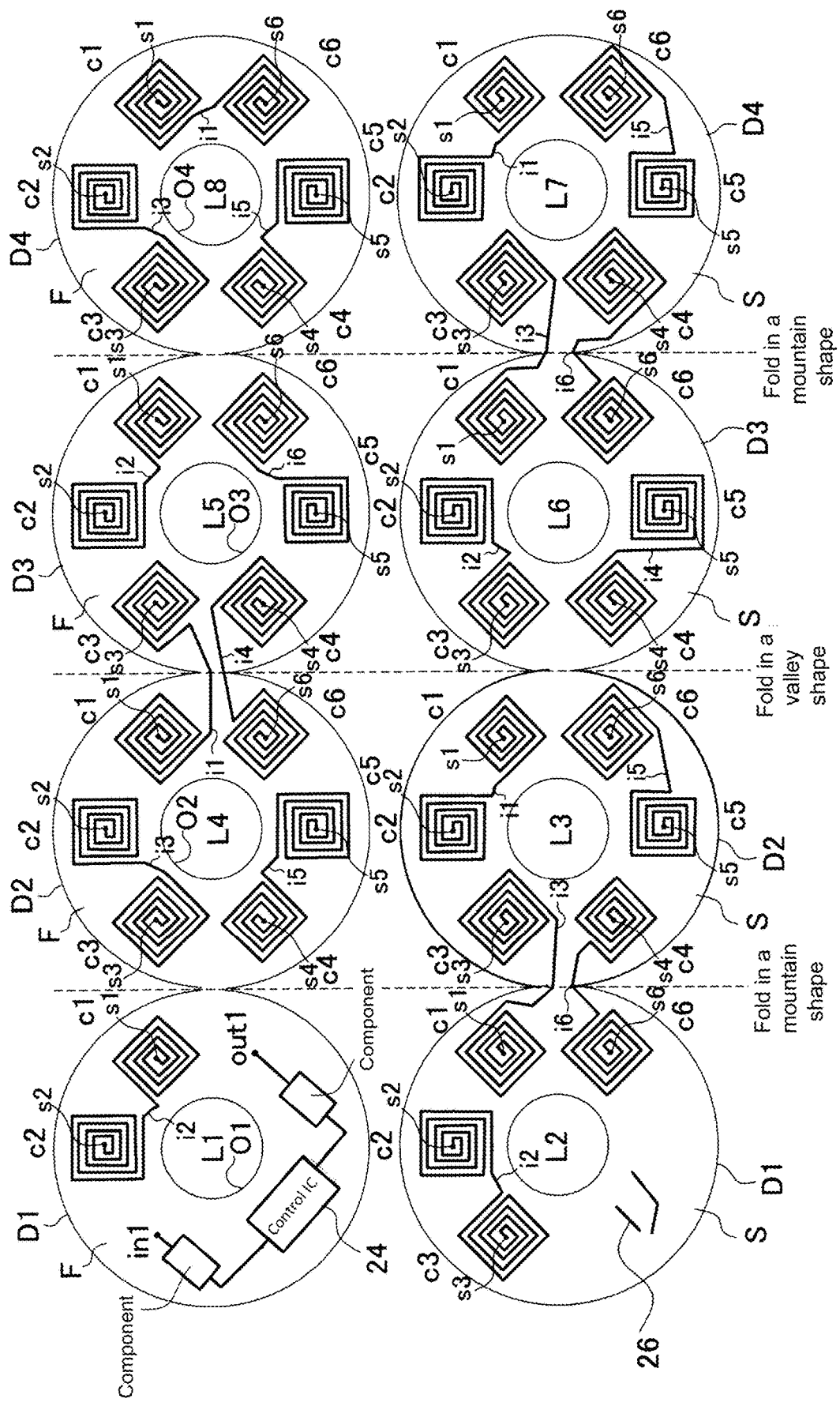
FIG. 1 is a plan view and a bottom view of a resin substrate that forms a coil according to a first embodiment of the present invention.

Embodiments will now be described with reference to the accompanying drawings, wherein like reference numerals designate corresponding or identical elements throughout the various drawings.

First Embodiment

Figure 2:
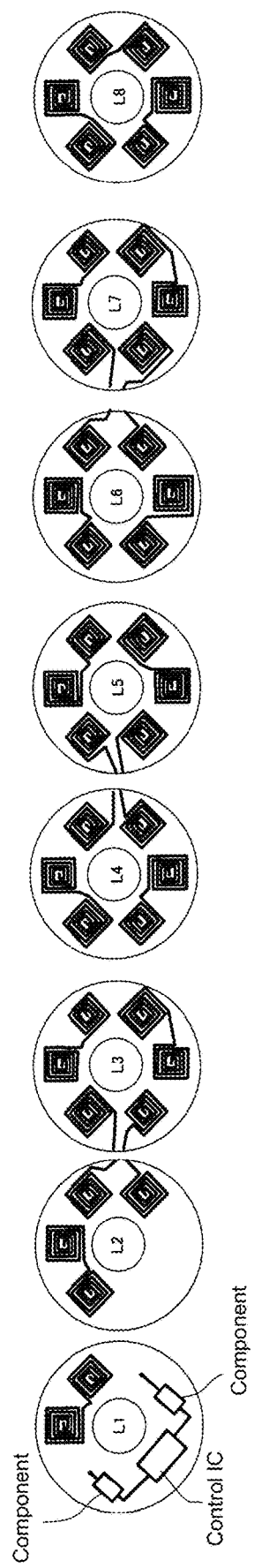
FIG. 2 is an exploded view of the coil of the first embodiment.

FIG. 1 is a plan view and a bottom view of a resin substrate that forms a coil according to a first embodiment; FIG. 2 is an exploded view of the coil of the first embodiment; and FIG. 3A-3C are schematic diagrams illustrating manufacturing processes of the coil of the first embodiment.

Figure 3A:
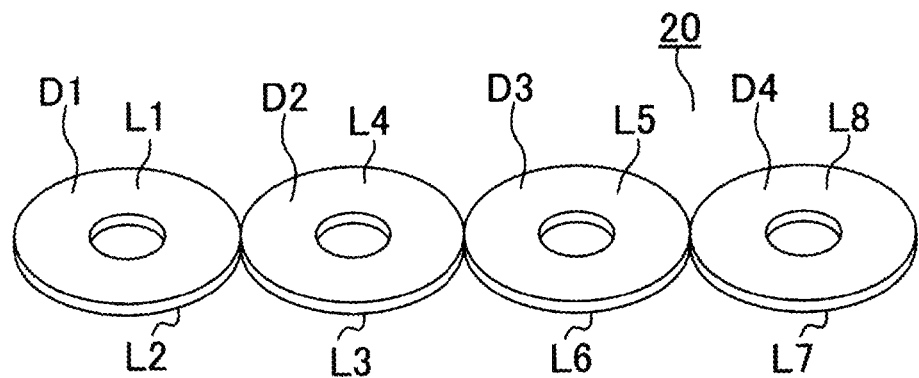
FIG. 3A-3C are schematic diagrams illustrating manufacturing processes of the coil of the first embodiment.
Figure 3B:
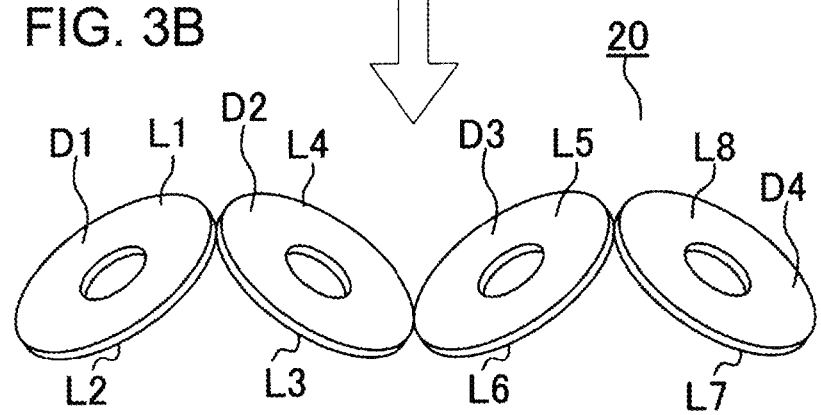
Figure 3C:
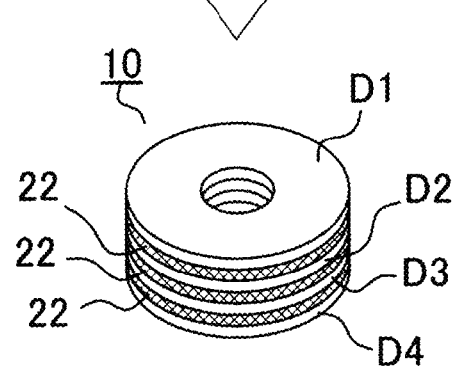

As illustrated in FIG. 3A, a resin substrate 20 is formed by a series of 4 connected disks including a first disk (D1), a second disk (D2), a third disk (D3), and a fourth disk (D4). As illustrated in FIG. 3B, the first disk (D1), the second disk (D2), the third disk (D3), and the fourth disk (D4) are folded. A coil 10 illustrated in FIG. 3C is formed. That is, the first disk (D1) and the second disk (D2) are folded in a mountain shape; the second disk (D2) and the third disk (D3) are folded in a valley shape; and the third disk (D3) and the fourth disk (D4) are folded in a mountain shape. The coil 10 is used as a coil of a fan motor of a computer. A magnetic sheet 22 is provided between the first disk (D1) and the second disk (D2), between the second disk (D2) and the third disk (D3), and between the third disk (D3) and the fourth disk (D4). The magnetic sheet may contain magnetic particles. Examples of the magnetic particles include iron oxide (III) particles, cobalt iron oxide particles, iron particles, silicon iron particles, magnetic alloy particles, ferrite particles, and the like. Instead of the magnetic sheet 22, it is also possible to use an adhesive sheet that does not contain a magnetic material.

As illustrated in FIG. 1, a first coil (L1) is formed on a front surface (first surface) (F) of the first disk (D1). A second coil (L2) is formed on a back surface (second surface) (S) of the first disk (D1). A wiring 24 including a mounting part for an IC chip is formed together with the first coil (L1) on the first surface (F) of the first disk (D1). A wiring 26 is formed together with the second coil (L2) on the second surface (S) of the first disk (D1). A fourth coil (L4) is formed on a first surface (F) of the second disk (D2), and a third coil (L3) is formed on a second surface (S) of the second disk (D2). A fifth coil (L5) is formed on a first surface (F) of the third disk (D3), and a sixth coil (L6) is forming on a second surface (S) of the third disk (D3). An eighth coil (L8) is formed on a first surface (F) of the fourth disk (D4), and a seventh coil (L7) is formed on a second surface (S) of the fourth disk (D4). An opening (O1) is formed at a center of the first disk (D1); an opening (O2) is formed at a center of the second disk (D2); an opening (O3) is formed at a center of the third disk (D3); and an opening (O4) is formed at a center of the fourth disk (D4). The openings (O1, O2, O3, O4) are for inserting a shaft of a fan motor. The third coil (L3), the fourth coil (L4), the fifth coil (L5), the sixth coil (L6), the seventh coil (L7), and the eighth coil (L8) each have 6 coil poles including a first coil pole (c1), a second coil pole (c2), a third coil pole (c3), a fourth coil pole (c4), a fifth coil pole (c5), and a sixth coil pole (c6). The first coil (L1) has 2 coil poles including a first coil pole (c1) and a second coil pole (c2). The second coil (L2) has 4 coil poles including a first coil pole (c1), a second coil pole (c2), a third coil pole (c3), and a sixth coil pole (c6). The first coil pole (c1) and the second coil pole (c2) of the first coil (L1) on the first surface (F) side are wound counterclockwise. The first coil pole (c1), the second coil pole (c2), the third coil pole (c3), the fourth coil pole (c4), the fifth coil pole (c5), and the sixth coil pole (c6) of each of the fourth coil (L4), the fifth coil (L5), and the eighth coil (L8) are wound counterclockwise. The first coil pole (c1), the second coil pole (c2), the third coil pole (c3), and the sixth coil pole (c6) of the second coil (L2) on the second surface (S) side are wound clockwise in FIG. 1, but are wound counterclockwise when viewed from the first surface (F) side. The first coil pole (c1), the second coil pole (c2), the third coil pole (c3), the fourth coil pole (c4), the fifth coil pole (c5), and the sixth coil pole (c6) of each of the third coil (L3), the sixth coil (L6), and the seventh coil (L7) are wound counterclockwise when viewed from the first surface (F) side. Through holes (s1, s2, s3, s4, s5, s6) are respectively provided as centers of the first coil pole (c1), the second coil pole (c2), the third coil pole (c3), the fourth coil pole (c4), the fifth coil pole (c5), and the sixth coil pole (c6).

A current from an input (in1) provided on the first surface (F) of the first disk (D1) passes through the through hole (s3) of the third coil pole (c3) on the second surface (S) of the first disk (D1), and passes through the spirally spreading third coil pole (c3), and reaches the second coil pole (c2) via a connection wire (i2) between the third coil pole and the second coil pole, and reaches the through hole (s2) of the second coil pole via the spirally narrowing second coil pole. Then, the current passes through the second coil pole (c2) on the first surface (F) via the through hole (s2), and passes through the first coil pole (c1) via a connection wire (i2), and passes through the through hole (s1) of the first coil pole (c1), and reaches the first coil pole (c1) on the second surface (S) of the first disk (D1), and reaches the third coil pole (c3) on the second surface (S) of the second disk (D2) via a connection wire (i3) from an outer edge of the first coil pole. The current reaches the third coil pole (c3) on the first surface (F) of the second disk (D2) via the through hole (s3) of the third coil pole (c3), and passes through the third coil pole, and reaches the second coil pole (c2) via a connection wire (i3), and reaches the second coil pole (c2) on the second surface (S) via the through hole (s2) of the second coil pole. The current reaches the first coil pole (c1) via a connection wire (i1) from the second coil pole (c2) on the second surface, and reaches the first coil pole (c1) on the first surface (F) via the through hole (s1) of the first coil pole. The current reaches the third coil pole (c3) of the third disk (D3) via a connection wire (i1) from the first coil pole (c1) of the second disk (D2). The current reaches the third coil pole (c3) on the second surface (S) via the through hole (s3) of the third coil pole (c3), and reaches the second coil pole (c2) via a connection wire (i2) from the third coil pole (c3). The current reaches the second coil pole (c2) on the first surface (F) via the through hole (s2) of the second coil pole, and reaches the first coil pole (c1) via a connection wire (i2) from the second coil pole. The current reaches the first coil pole (c1) on the second surface (S) via the through hole (s1) of the first coil pole, and reaches the third coil pole (c3) of the fourth disk (D4) via a connection wire (i3) from the first coil pole (c1) of the third disk (D3). The current reaches the third coil pole (c3) on the first surface (F) via the through hole (s3) of the third coil pole, and passes through the third coil pole (c3), and reaches the second coil pole (c2) via a connection wire (i3). The current reaches the second coil pole (c2) on the second surface (S) via the through hole (s2) of the second coil pole, and reaches the first coil pole (c1) via a connection wire (i1) from a second coil pole (c2). The current reaches the first coil pole (c1) on the first surface via the through hole (s1) of the first coil, and reaches the sixth coil pole (c6) via a connection wire (i1) from the first coil pole (c1). The current reaches the sixth coil pole (c6) on the second surface (S) via the through hole (s6) of the sixth coil, and reaches the fifth coil pole (c5) via a connection wire (i5) from the sixth coil pole (c6). The current reaches the fifth coil pole (c5) on the first surface (F) via the through hole (s5) of the fifth coil, and reaches the fourth coil pole (c4) via a connection wire (i5) from the fifth coil pole (c5). The current reaches the fourth coil pole (c4) on the second surface (S) via the through hole (s4) of the fourth coil, and reaches the sixth coil pole (c6) of the third disk via a connection wire (i6) from the sixth coil pole (c6). The current reaches the sixth coil pole (c6) on the first surface (F) via the through hole (s6) of the sixth coil, and reaches the fifth coil pole (c5) via a connection wire (i6) from the sixth coil pole (c6). The current reaches the fifth coil pole (c5) on the second surface (S) via the through hole (s5) of the fifth coil, and reaches the fourth coil pole (c4) via a connection wire (i4) from the fifth coil pole (c5). The current reaches the fourth coil pole (c4) on the first surface (F) via the through hole (s4) of the fourth coil, and reaches the sixth coil pole (c6) of the second disk (D2) via a connection wire (i4) from the fourth coil pole (c4). The current reaches the sixth coil pole (c6) on the second surface (S) via the through hole (s6) of the sixth coil, and reaches the fifth coil pole (c5) via a connection wire (i5) from the sixth coil pole (c6). The current reaches the fifth coil pole (c5) on the first surface (F) via the through hole (s5) of the fifth coil, and reaches the fourth coil pole (c4) via a connection wire (i5) from the fifth coil pole (c5). The current reaches the fourth coil pole (c4) on the second surface (S) via the through hole (s4) of the fourth coil, and reaches sixth coil pole (c6) of the first disk (D1) via a connection wire (i6) from the fourth coil pole (c4), and reaches an output (out1) on the first surface via the through hole (s6) of the sixth coil.

Figure 4:
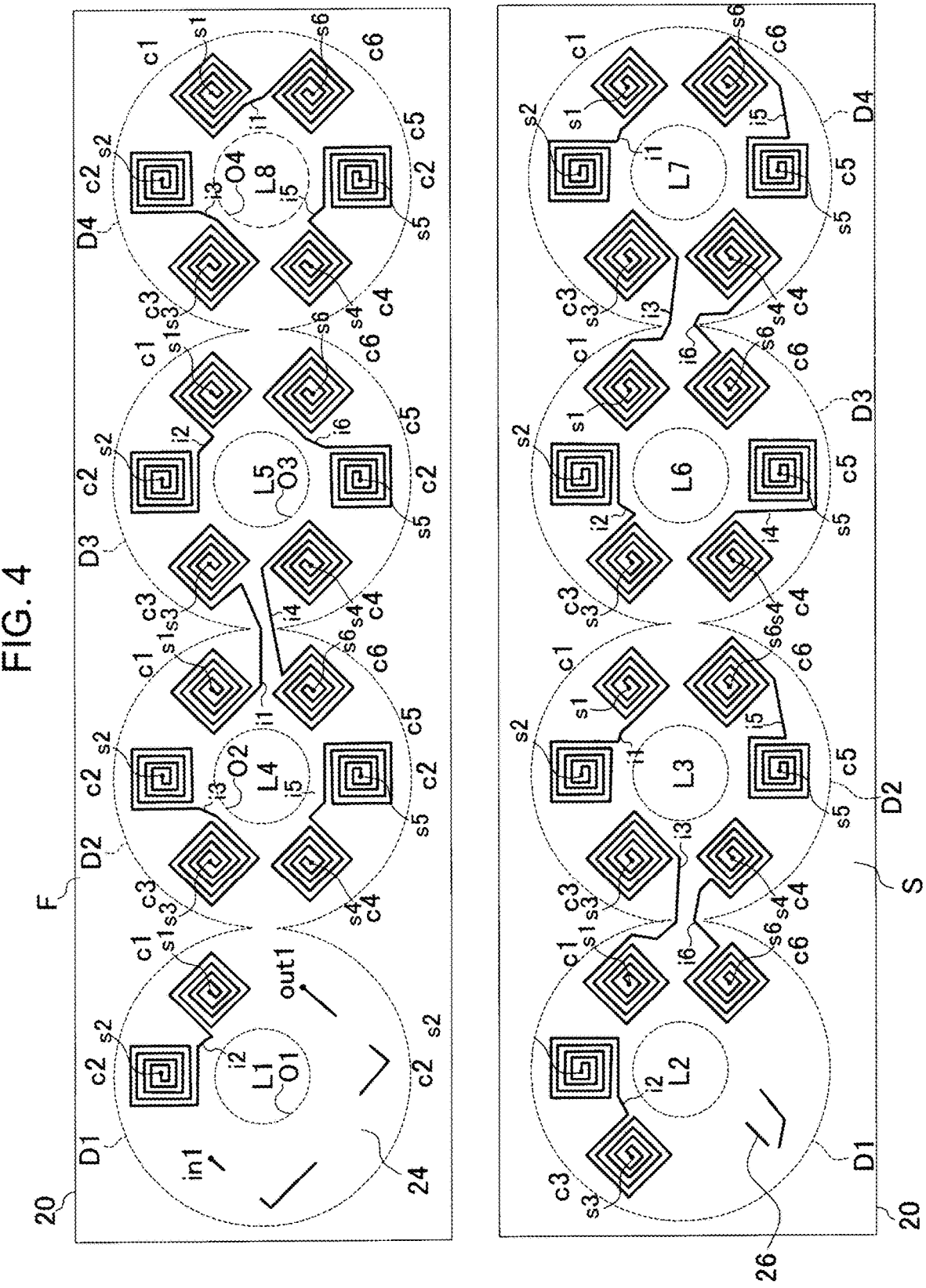
FIG. 4 is a plan view and a bottom view illustrating a manufacturing process of a resin substrate that forms a coil of the first embodiment.

FIG. 4 illustrates a manufacturing process of the coil of the first embodiment.

On the first surface (F) of the resin substrate 20 that forms a flex substrate of polyimide or the like, the first coil (L1), the through holes (s2, s1) and the wiring 24 of the first disk (D1) are formed, the fourth coil (L4) and the through holes (s1, s2, s3, s4, s5, s6) of the second disk (D2) are formed, the fifth coil (L5) and the through holes (s1, s2, s3, s4, s5, s6) of the third disk (D3) are formed, and the eighth coil (L8) and the through holes (s1, s2, s3, s4, s5, s6) of the fourth disk (D4) are formed. On the second surface (S) of the resin substrate 20, the second coil (L2) and the wiring 26 of the first disk (D1) are formed, the coil (L3) of the second disk (D2) is formed, the sixth coil (L6) of the third disk (D3) is formed, and the seventh coil (L7) of the fourth disk (D4) is formed. Then, the resin substrate 20 is cut at outer edges of the first disk (D1), the second disk (D2), the third disk (D3), and the fourth disk (D4) indicated with chain lines in FIG. 4, and, the opening (O1) is formed at the center of the first disk (D1), the opening (O2) is formed at the center of the second disk (D2), the opening (O3) is formed at the center of the third disk (D3), and the opening (O4) is formed at the center of the fourth disk (D4), and a series of four connected disks including the first disk (D1), the second disk (D2), the third disk (D3), and the fourth disk (D4) illustrated in FIGS. 1 and 3A is formed. Then, the resin substrate 20 is folded as illustrated in FIG. 3B, and the coil 10 illustrated in FIG. 3C is completed.

According to the coil 10 of the first embodiment, the spiral-shaped first coil (L1), fourth coil (L4), fifth coil (L5), and eighth coil (L8) are formed on the first surface (F) of the resin substrate 20, and the spiral-shaped second coil (L2), third coil (L3), sixth coil (L6), and seventh coil (L7) are formed on the second surface of the resin substrate 20. Therefore, as compared to a laminated structure, the coil 10 can be easily manufactured. Further, since the coil 10 is formed from the one-layer resin substrate 20, the through holes (s1, s2, s3, s4, s5, s6) can be formed by providing through holes with a drill or laser. Therefore, as compared to a laminated structure in which vias of multiple stages are provided, high connection reliability can be obtained. Further, since each coil is formed in a spiral shape, the number of turns of the coil is large, and a high inductance can be achieved, and the coil 10 is not an inductance for adjusting electrical characteristics, but can be used for driving a motor. Since the coil is wound in a spiral shape rather than a spring shape, the coil can be reduced in thickness.

Modified Embodiment of First Embodiment

Figure 5:
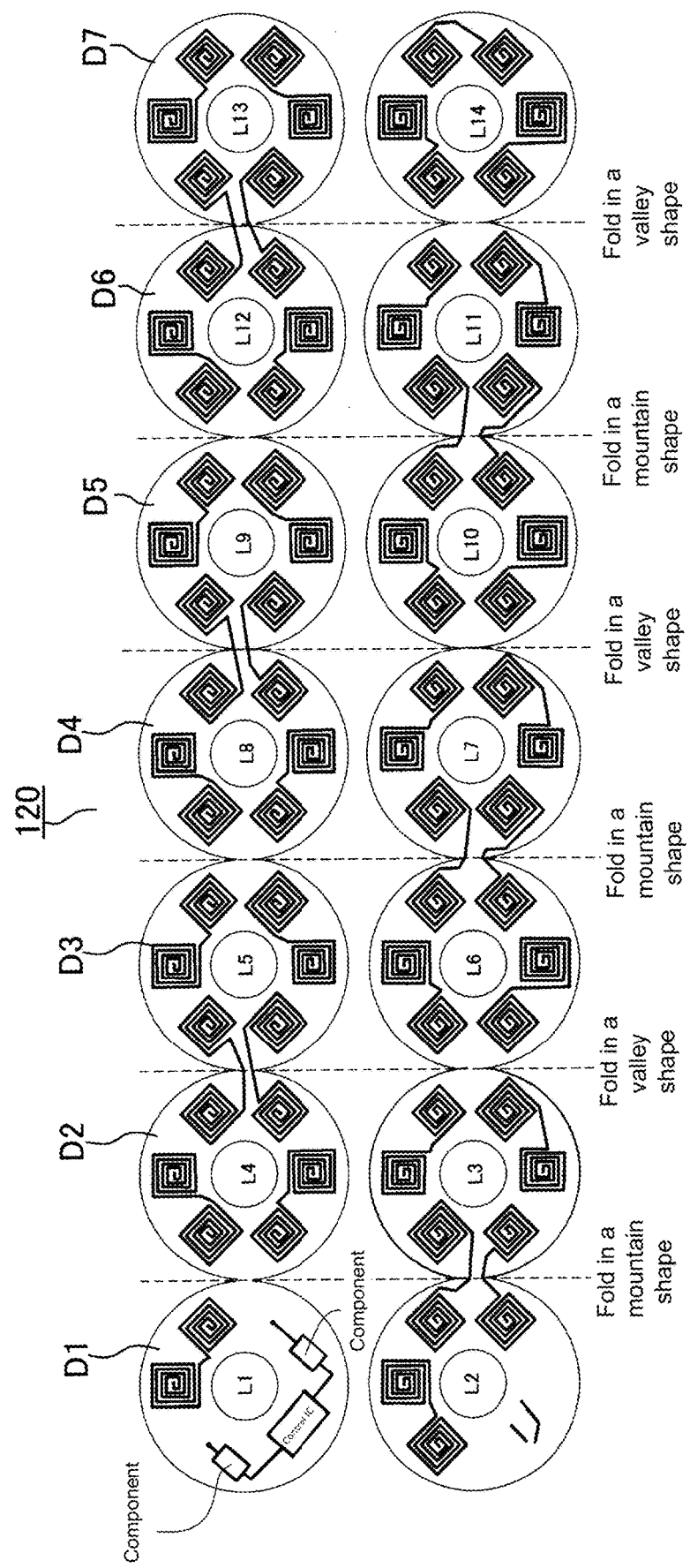
FIG. 5 is a plan view and a bottom view of a resin substrate that forms a coil according to a modified embodiment of the first embodiment of the present invention.

FIG. 5 illustrates a resin substrate 120 that forms a coil according to a modified embodiment of the first embodiment.

The resin substrate 120 is formed by a series of 7 connected disks including a first disk (D1), a second disk (D2), a third disk (D3), a fourth disk (D4), a fifth disk (D5), a sixth disk (D6), and a seventh disk (D7). Similar to the first embodiment illustrated in FIG. 3B, the first disk (D1), the second disk (D2), the third disk (D3), the fourth disk (D4), the fifth disk (D5), the sixth disk (D6), and the seventh disk (D7) are folded and a coil is formed. That is, the first disk (D1) and the second disk (D2) are folded in a mountain shape; the second disk (D2) and the third disk (D3) are folded in a valley shape; the third disk (D3) and the fourth disk (D4) are folded in a mountain shape; the fourth disk (D4) and the fifth disk (D5) are folded in a valley shape; the fifth disk (D5) and the sixth disk (D6) are folded in a mountain shape; and the sixth disk (D6) and the seventh disk (D7) are folded in a valley shape. In the modified embodiment of the first embodiment, inductance can be further increased.

Second Embodiment

Figure 6:
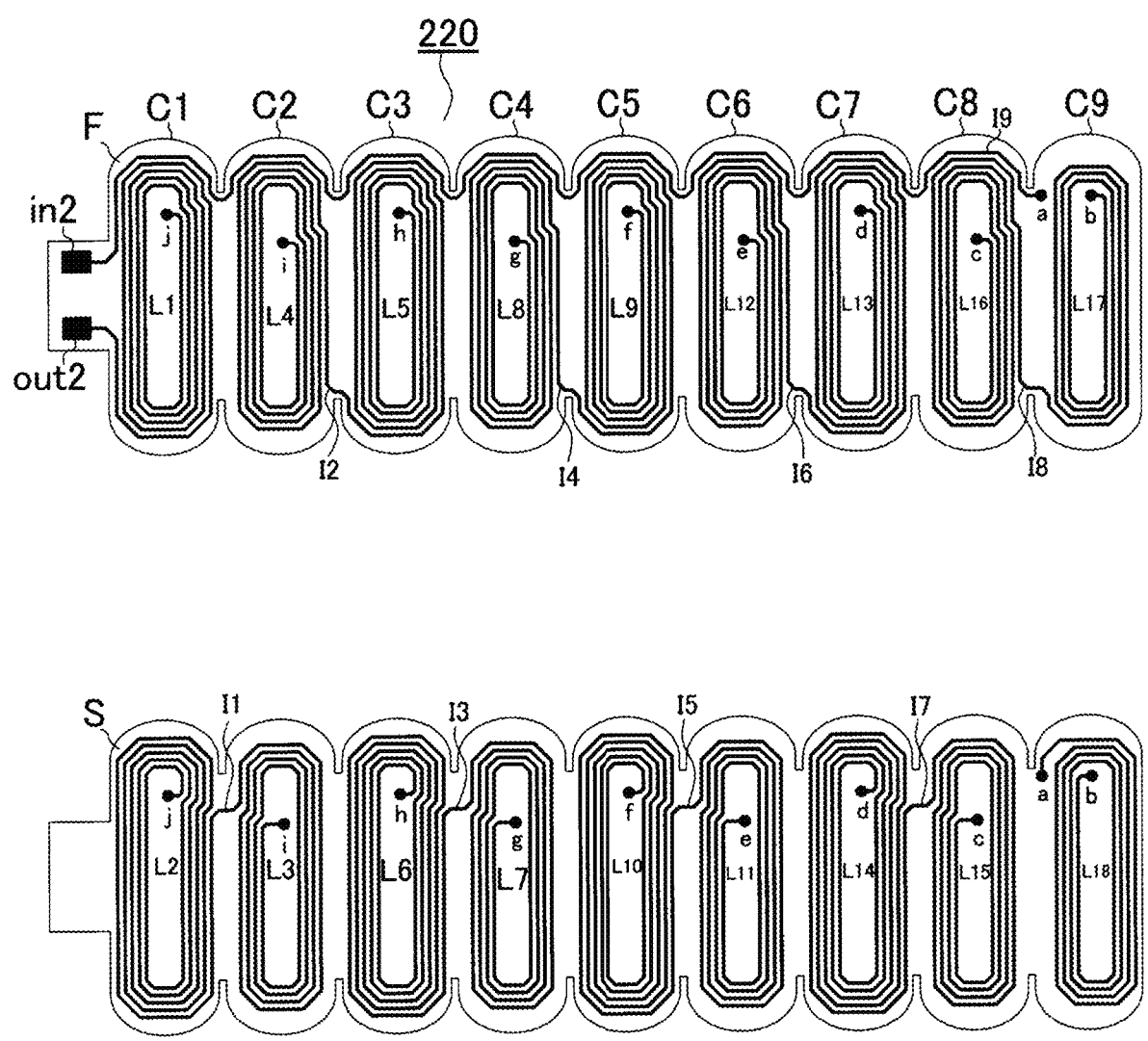
FIG. 6 is a plan view and a bottom view of a resin substrate that forms a coil according to a second embodiment of the present invention.

FIG. 6 is a plan view and a bottom view of a resin substrate 220 that forms a coil according to a second embodiment of the present invention. The resin substrate 220 is formed by a series of 9 connected elliptical plates including a first elliptical plate (C1), a second elliptical plate (C2), third elliptical plate (C3), fourth elliptical plate (C4), a fifth elliptical plate (C5), a sixth elliptical plate (C6), a seventh elliptical plate (C7), an eighth elliptical plate (C8), and a ninth elliptical plate (C9), and is folded in a zigzag shape, and a coil is formed in the same way as in the first embodiment. A magnetic sheet is provided between the folded elliptical plates. A pair of coils of the second embodiment is used as a vibration motor (vibrator) of a mobile phone.

A first coil (L1) is formed on a front surface (first surface) (F) of the first elliptical plate (C1). A second coil (L2) is formed on a back surface (second surface) (S) of the first elliptical plate (C1). An input (in2) and an output (out2) are formed on the first surface (F) of the first elliptical plate (C1). A fourth coil (L4) is formed on a first surface (F) of the second elliptical plate (C2), and a third coil (L3) is formed on a second surface (S) of the second elliptical plate (C2). A fifth coil (L5) is formed on a first surface (F) of the third elliptical plate (C3), and a sixth coil (L6) is formed on a second surface (S) of the third elliptical plate (C3). An eighth coil (L8) is formed on a first surface (F) of the fourth elliptical plate (C4), and a seventh coil (L7) is formed on a second surface (S) of the fourth elliptical plate (C4). A ninth coil (L9) is formed on a first surface (F) of the fifth elliptical plate (C5), and a tenth coil (L10) is formed on a second surface (S) of the fifth elliptical plate (C5). A twelfth coil (L12) is formed on a first surface (F) of the sixth elliptical plate (C6), and an eleventh coil (L11) is formed on a second surface (S) of the sixth elliptical plate (C6). A thirteenth coil (L13) is formed on a first surface (F) of the seventh elliptical plate (C7), and a fourteenth coil (L14) is formed on a second surface (S) of the seventh elliptical plate (C7). A sixteenth coil (L16) is formed on a first surface (F) of the eighth elliptical plate (C8), and a fifteenth coil (L15) is formed on a second surface (S) of the eighth elliptical plate (C8). A seventeenth coil (L17) is formed on a first surface (F) of the ninth elliptical plate (C9), and an eighteenth coil (L18) is formed on a second surface (S) of the ninth elliptical plate (C9). The first coil (L1), the fourth coil (L4), the fifth coil (L5), the eighth coil (L8), the ninth coil (L9), the twelfth coil (L12), the thirteenth coil (L13), the sixteenth coil (L16), and the seventeenth coil (L17) on the first surface (F) side are each formed in a spiral shape spreading in a clockwise direction. The second coil (L2), the third coil (L3), the sixth coil (L6), the seventh coil (L7), the tenth coil (L10), the eleventh coil (L11), the fourteenth coil (L14), the fifteenth coil (L15), and the eighteenth coil (L8) 7 on the second surface (S) side are each wound counterclockwise in FIG. 6, but are wound clockwise when viewed from the first surface (F) side.

A current from the input (in2) provided on the first surface (F) of the first elliptical plate (C1) passes through a through hole (a) of the ninth elliptical plate (C9) via a connection wire (I9), and reaches a through hole (b) via the eighteenth coil (L18) on the second surface side of the ninth elliptical plate (C9). The current passes through the seventeenth coil (L17) on the first surface (F) side from the through hole (b), and passes through the sixteenth coil (L16) of the eighth elliptical plate (C8) via a connection wire (I8), and reaches a through hole (c). The current passes through the fifteenth coil (L15) on the second surface (S) side from the through hole (c), and passes through the fourteenth coil (L14) of the seventh elliptical plate (C7) via a connection wire (I7) and reaches a through hole (d). The current passes through the thirteenth coil (L13) on the first surface (F) side from the through hole (d), and passes through the twelfth coil (L12) of the sixth elliptical plate (C6) via a connection wire (I6), and reaches a through hole (e). The current passes through the eleventh coil (L11) on the second surface (S) side from the through hole (e), and passes through the tenth coil (L10) of the fifth elliptical plate (C5) via a connection wire (I5), and reaches a through hole (f). The current passes through the ninth coil (L9) on the first surface (F) side from the through hole (f), and passes through the eighth coil (L8) of the fourth elliptical plate (C4) via a connection wire (I4), and reaches a through hole (g). The current passes through the seventh coil (L7) on the second surface (S) side from the through hole (g), and passes through the sixth coil (L6) of the third elliptical plate (C3) via a connection wire (I3), and reaches a through hole (h). The current passes through the fifth coil (L5) on the first surface (F) side from the through hole (h), and passes through the fourth coil (L4) of the second elliptical plate (C2) via a connection wire (I2), and reaches a through hole (i). The current passes through the third coil (L3) on the second surface (S) side from the through hole (i), and passes through the second coil (L2) of the first elliptical plate (C1) via a connection wire (I1), and reaches a through hole (j). The current passes the first coil (L1) on the first surface (F) side from the through hole (j), and reaches the output (out2).

According to the coil of the second embodiment, the spiral-shaped first coil (L1), fourth coil (L4), fifth coil (L5), eighth coil (L8), ninth coil (L9), twelfth coil (L12), thirteenth coil (L13), sixteenth coil (L16), and seventeenth coil (L17) are formed on the first surface (F) of the resin substrate 220, and the spiral-shaped second coil (L2), third coil (L3), sixth coil (L6), seventh coil (L7), tenth coil (L10), eleventh coil (L11), fourteenth coil (L14), fifteenth coil (L15), and eighteenth coil (L18) are formed on the second surface of the resin substrate 220. Therefore, as compared to a laminated structure, the coil can be easily manufactured. Further, since the coil of the present invention is formed from the one-layer resin substrate 220, high reliability can be obtained. Further, since each coil is formed in a spiral shape, the number of turns of the coil is large, and a high inductance can be achieved, and the coil can be used for driving a vibrator.

In Japanese Patent Laid-Open Publication No. 2001-135548, insulating layers in which half-turn or one-turn conductor patterns are formed are laminated. It is difficult to form a coil having a high inductance. Further, all of the conductor patterns of the layers are connected to each other via through holes (conductor projections). When the number of turns of the coil is increased, it is difficult to maintain connection reliability.

A coil according to an embodiment of the present invention includes: a resin substrate that has a first surface and a second surface, the second surface being on an opposite side with respect to the first surface; a spiral-shaped first coil that is on the first surface side; a spiral-shaped second coil that is on the second surface side and is formed at a position corresponding to the first coil; a spiral-shaped third coil that is on the second surface side and is provided adjacent to the second coil; and a spiral-shaped fourth coil that is on the first surface side and is formed at a position corresponding to the third coil. The resin substrate is folded such that the second coil and the third coil oppose each other.

According to an embodiment of the present invention, the spiral-shaped first coil and fourth coil are formed on the first surface of the resin substrate, and the spiral-shaped second coil and third coil are formed on the second surface of the resin substrate. Therefore, as compared to a laminated structure, the coil of the present invention can be easily manufactured. Further, since the coil of the present invention is formed from the one-layer resin substrate, high reliability can be obtained. Further, since each coil is formed in a spiral shape, the number of turns of the coil is large, and a high inductance can be achieved.

Obviously, numerous modifications and variations of the present invention are possible in light of the above teachings. It is therefore to be understood that within the scope of the appended claims, the invention may be practiced otherwise than as specifically described herein.

The invention claimed is:

1. A coil, comprising:
   a resin substrate;
   a first coil structure formed on a first surface of the resin substrate;
   a second coil structure formed on a second surface of the resin substrate on an opposite side with respect to the first surface such that the second coil structure is formed at a position corresponding to the first coil structure;
   a third coil structure formed on the second surface such that the third coil structure is positioned adjacent to the second coil structure; and
   a fourth coil structure formed on the first surface such that the fourth coil structure is formed at a position corresponding to the third coil structure,
   wherein the resin substrate is folded such that the second coil structure and the third coil structure oppose each other, each of the first, second, third and fourth coil structures comprises a plurality of coil poles in an even number, the plurality of coil poles comprises a plurality of pairs such that each of the pairs has one coil pole spirally spreading around a respective through hole conductor and an outer edge wiring connecting to an outer edge wiring of the other coil pole, and the other coil pole positioned adjacent to the one coil pole and spirally narrowing around a respective through hole conductor, and the resin substrate comprises a series of connected disks comprising a first disk and a second disk such that the first disk includes the first and second coil structures and a second disk includes the third and fourth coil structures.

2. A coil according to claim 1, wherein the first and second coil structures are formed such that a through hole conductor formed though the resin substrate is connecting the first and second coil structures, the third and fourth coil structures are formed such that a through hole conductor formed though the resin substrate is connecting the third and fourth coil structures, and the second and third coil structures are formed such that a wiring formed on the second surface of the resin substrate is connecting the second and third coil structures.

3. A coil according to claim 1, further comprising:
   a fifth coil structure formed on the first surface of the resin substrate such that the fifth coil structure is positioned adjacent to the fourth coil structure; and
   a sixth coil structure formed on the second surface such that the sixth coil structure is formed at a position corresponding to the fifth coil structure,
   wherein the resin substrate is folded such that the fourth coil structure and the fifth coil structure oppose each other.

4. A coil according to claim 3, wherein the fifth and sixth coil structures are formed such that a through hole conductor formed though the resin substrate is connecting the fifth and sixth coil structures, and the fourth and fifth coil structures are formed such that a wiring formed on the first surface of the resin substrate is connecting the fourth and fifth coil structures.

5. A coil according to claim 1, wherein each of the third and fourth coil structures comprises six coil poles.

6. A coil according to claim 1, wherein the coil poles in the first, second, third and fourth coil structures are formed such that opposing coil poles have a spiral shape wound in a same direction.

7. A coil according to claim 1, wherein the first, second, third and fourth coil structures are configured to form a motor coil.

8. A coil according to claim 7, wherein the resin substrate has an opening portion configured to pass through an axis such that the opening is positioned in center portions of the first, second, third and fourth coil structures.

9. A coil according to claim 1, wherein the first, second, third and fourth coil structures are configured to form a vibration motor coil.

10. A coil according to claim 1, further comprising:
a magnetic sheet formed between the second coil structure and the third coil structure.

11. A coil according to claim 1, wherein the resin substrate comprises a flex substrate.

12. A coil according to claim 3, wherein each of the fifth and sixth coil structures comprises a plurality of coil poles in an even number, and the plurality of coil poles in each of the fifth and sixth coil structures comprises a plurality of pairs such that each of the pairs has one coil pole spirally spreading around a respective through hole conductor and an outer edge wiring connecting to an outer edge wiring of the other coil pole, and the other coil pole spirally narrowing around a respective through hole conductor.

13. A coil according to claim 5, wherein the coil poles in the first, second, third and fourth coil structures are formed such that opposing coil poles have a spiral shape wound in a same direction.

14. A coil according to claim 12, wherein the coil poles in the fifth and sixth coil structures are formed such that opposing coil poles have a spiral shape wound in a same direction.

15. A coil according to claim 2, wherein the coil poles in the first, second, third and fourth coil structures are formed such that opposing coil poles have a spiral shape wound in a same direction.

16. A coil according to claim 2, further comprising:
a magnetic sheet formed between the second coil structure and the third coil structure.

17. A coil according to claim 3, further comprising:
a first magnetic sheet formed between the second coil structure and the third coil structure; and
a second magnetic sheet formed between the fourth coil structure and the fifth coil structure.

18. A coil according to claim 4, further comprising:
a first magnetic sheet formed between the second coil structure and the third coil structure; and
a second magnetic sheet formed between the fourth coil structure and the fifth coil structure.

19. A coil according to claim 1, wherein the resin substrate has an opening portion configured to pass through an axis such that the opening is positioned in center portions of the first, second, third and fourth coil structures.

20. A coil according to claim 3, wherein the resin substrate has an opening portion configured to pass through an axis of the series of connected disks such that the opening is positioned in center portions of the first, second, third, fourth, fifth and sixth coil structures.

* * * * *